United States Patent
Takenaka et al.

(10) Patent No.: US 11,187,816 B2
(45) Date of Patent: Nov. 30, 2021

(54) RADIATION IMAGING APPARATUS AND RADIATION IMAGING SYSTEM

(71) Applicant: CANON KABUSHIKI KAISHA, Tokyo (JP)

(72) Inventors: Katsuro Takenaka, Honjo (JP); Atsushi Iwashita, Tokyo (JP); Shoshiro Saruta, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/211,668

(22) Filed: Dec. 6, 2018

(65) Prior Publication Data
US 2019/0179036 A1    Jun. 13, 2019

(30) Foreign Application Priority Data
Dec. 13, 2017 (JP) .............................. JP2017-238919

(51) Int. Cl.
*G01T 1/17* (2006.01)
*H04N 5/378* (2011.01)
*H04N 5/376* (2011.01)
*H04N 5/374* (2011.01)

(52) U.S. Cl.
CPC .............. *G01T 1/17* (2013.01); *H04N 5/376* (2013.01); *H04N 5/378* (2013.01); *H04N 5/3741* (2013.01)

(58) Field of Classification Search
CPC ........ G01T 1/17; H04N 5/3741; H04N 5/376; H04N 5/378
See application file for complete search history.

(56) References Cited

U.S. PATENT DOCUMENTS

| 7,342,221 B2 | 3/2008 | Takenaka et al. |
| 7,343,000 B2 | 3/2008 | Kameshima et al. |
| 7,381,963 B2 | 6/2008 | Endo et al. |

(Continued)

FOREIGN PATENT DOCUMENTS

| JP | 2010-003869 | 1/2010 |
| JP | 5694882 | 4/2010 |

(Continued)

OTHER PUBLICATIONS

U.S. Appl. No. 16/150,523, Eriko Sato, filed Oct. 3, 2018.

(Continued)

*Primary Examiner* — David P Porta
*Assistant Examiner* — Mamadou Faye
(74) *Attorney, Agent, or Firm* — Venable LLP

(57) ABSTRACT

Pixel array includes pixels each including conversion element, and switch having control terminal, first primary terminal connected to the conversion element, and second primary terminal connected to one of signal lines. The pixel array includes pixel groups each including pixels arrayed to form at least 2 row×2 column pattern. In pixels of each pixel group, the control terminals are connected to different driving lines and the second primary terminals are commonly connected to one of the signal lines. In the pixel groups, first and second pixel groups are arranged adjacent to each other in column direction. Signal is read from the first pixel group via the first signal line of the single lines. Signal is read from the second pixel group via the second signal line of the single lines.

19 Claims, 9 Drawing Sheets

(56) References Cited

U.S. PATENT DOCUMENTS

| | | |
|---|---|---|
| 7,386,089 B2 | 6/2008 | Endo et al. |
| 7,403,594 B2 | 7/2008 | Endo et al. |
| 7,442,939 B2 | 10/2008 | Yagi et al. |
| 7,491,960 B2 | 2/2009 | Yagi et al. |
| 7,514,663 B2 | 4/2009 | Yagi et al. |
| 7,532,706 B2 | 5/2009 | Kameshima et al. |
| 7,541,591 B2 | 6/2009 | Endo et al. |
| 7,573,038 B2 | 8/2009 | Yokoya et al. |
| 7,613,277 B2 | 11/2009 | Takenaka et al. |
| 7,718,973 B2 | 5/2010 | Endo et al. |
| 7,724,874 B2 | 5/2010 | Kameshima et al. |
| 7,732,776 B2 | 6/2010 | Takenaka et al. |
| 7,750,309 B2 | 7/2010 | Endo et al. |
| 7,791,034 B2 | 9/2010 | Kameshima et al. |
| 7,791,035 B2 | 9/2010 | Yokoyama et al. |
| 7,847,263 B2 | 12/2010 | Yagi et al. |
| 7,869,568 B2 | 1/2011 | Yokoyama et al. |
| 7,872,218 B2 | 1/2011 | Endo et al. |
| 7,880,145 B2 | 2/2011 | Yagi et al. |
| 8,093,562 B2 | 1/2012 | Yokoyama et al. |
| 8,107,588 B2 | 1/2012 | Kameshima et al. |
| 8,167,486 B2 | 5/2012 | Takenaka et al. |
| 8,222,611 B2 | 7/2012 | Yagi et al. |
| 8,247,779 B2 | 8/2012 | Kameshima et al. |
| 8,575,557 B2 | 11/2013 | Okada |
| 8,576,294 B2 | 11/2013 | Kameshima et al. |
| 8,723,996 B2 | 5/2014 | Yokoyama et al. |
| 8,792,024 B2 | 7/2014 | Takenaka et al. |
| 8,809,795 B2 | 8/2014 | Takenaka et al. |
| 8,829,438 B2 | 9/2014 | Sato et al. |
| 9,048,154 B2 | 6/2015 | Takenaka et al. |
| 9,052,400 B2 | 6/2015 | Saruta et al. |
| 9,054,012 B2 | 6/2015 | Nomura et al. |
| 9,128,196 B2 | 9/2015 | Sato et al. |
| 9,134,432 B2 | 9/2015 | Iwashita et al. |
| 9,148,605 B1 * | 9/2015 | Wang ............... H04N 5/3575 |
| 9,234,966 B2 | 1/2016 | Sugawara et al. |
| 9,423,512 B2 | 8/2016 | Sato et al. |
| 9,445,030 B2 | 9/2016 | Yagi et al. |
| 9,462,989 B2 | 10/2016 | Takenaka et al. |
| 9,468,414 B2 | 10/2016 | Ryu et al. |
| 9,470,800 B2 | 10/2016 | Iwashita et al. |
| 9,470,802 B2 | 10/2016 | Okada et al. |
| 9,541,653 B2 | 1/2017 | Iwashita et al. |
| 9,568,614 B2 | 2/2017 | Ishida et al. |
| 9,655,586 B2 | 5/2017 | Yagi et al. |
| 9,812,474 B2 | 11/2017 | Yagi et al. |
| 9,971,046 B2 | 5/2018 | Ryu et al. |
| 9,980,685 B2 | 5/2018 | Iwashita et al. |
| 9,989,656 B2 | 6/2018 | Sato et al. |
| 10,009,990 B2 | 6/2018 | Takenaka et al. |
| 10,070,091 B2 * | 9/2018 | Okumura ........... H04N 5/37457 |
| 2005/0121616 A1 * | 6/2005 | Petrick ............... H04N 5/32 250/370.09 |
| 2009/0202042 A1 * | 8/2009 | Jung ................. G01T 1/24 378/98 |
| 2010/0148080 A1 | 6/2010 | Endo et al. |
| 2011/0080492 A1 * | 4/2011 | Matsuda ........... H01L 27/14603 348/222.1 |
| 2011/0317054 A1 | 12/2011 | Kameshima et al. |
| 2013/0153775 A1 | 6/2013 | Nomura et al. |
| 2013/0163716 A1 | 6/2013 | Okada |
| 2013/0168559 A1 | 7/2013 | Saruta et al. |
| 2014/0034836 A1 | 2/2014 | Takei et al. |
| 2014/0239186 A1 | 8/2014 | Sato et al. |
| 2014/0361189 A1 | 12/2014 | Kameshima et al. |
| 2016/0097865 A1 | 4/2016 | Sasaki et al. |
| 2016/0172414 A1 | 6/2016 | Saruta et al. |
| 2016/0270755 A1 | 9/2016 | Takenaka et al. |
| 2017/0285189 A1 | 10/2017 | Ryu et al. |
| 2017/0295336 A1 * | 10/2017 | Kimura ................. H04N 5/378 |
| 2018/0070906 A1 | 3/2018 | Terui et al. |
| 2018/0128755 A1 | 5/2018 | Iwashita et al. |
| 2018/0136343 A1 | 5/2018 | Terui et al. |
| 2018/0146143 A1 * | 5/2018 | Derks ................. H04N 5/32 |
| 2018/0239033 A1 | 8/2018 | Ishii et al. |
| 2018/0317868 A1 | 11/2018 | Terui et al. |
| 2018/0328862 A1 | 11/2018 | Sato et al. |

FOREIGN PATENT DOCUMENTS

| | | |
|---|---|---|
| JP | 2012-100081 A | 5/2012 |
| JP | 2013-150304 A | 8/2013 |

OTHER PUBLICATIONS

U.S. Appl. No. 15/757,693, Katsuro Takenaka, filed Mar. 6, 2018.
U.S. Appl. No. 16/103,150, Atsushi Iwashita, filed Aug. 14, 2018.

* cited by examiner

RADIATION IMAGING APPARATUS AND RADIATION IMAGING SYSTEM

BACKGROUND OF THE INVENTION

Field of the Invention

The present invention relates to a radiation imaging apparatus and a radiation imaging system.

Description of the Related Art

Radiation imaging apparatuses have been widely used in fields of medical image diagnosis, non-destructive inspection, and the like. In some cases, a radiation imaging apparatus performs imaging with higher priority being given to resolution than to speed, and in other cases, with higher priority being given to speed than to resolution. For example, in still-image imaging, higher priority is generally given to resolution than to speed, whereas in moving-image imaging, higher priority is generally given to speed than resolution.

Japanese Patent No. 5694882 discloses a radiation imaging apparatus provided with two switching elements per pixel. This radiation imaging apparatus uses different switching elements for still-image capturing and moving-image capturing to read out a signal with a high resolution in still-image capturing and a signal with a low resolution in moving-image capturing.

As in the configuration disclosed in Japanese Patent No. 5694882, when high-resolution reading and low-resolution reading are to be implemented by adding switching elements, an increase in the number of switching elements can lead to a reduction in yield or an increase in cost. In addition, an increase in the number of switching elements can impose a limitation on the area of a conversion element and degrade sensitivity.

SUMMARY OF THE INVENTION

The present invention provides a technique advantageous in enabling changes in readout resolution while suppressing an increase in the number of switches required.

One of aspects of the present invention provides a radiation imaging apparatus comprising a pixel array in which a plurality of pixels are arranged to form a plurality of rows and a plurality of columns and a readout circuit configured to read out signals from the pixel array via a plurality of signal lines, wherein each pixel includes a conversion element configured to convert radiation into a signal and a switch, the switch including a control terminal, a first primary terminal electrically connected to the conversion element, and a second primary terminal electrically connected to one of the plurality of signal lines, the pixel array includes a plurality of pixel groups each including pixels arrayed to form at least a 2 row×2 column pattern, the switches of pixels belonging to each pixel group are configured such that the control terminals are electrically connected to a plurality of different driving lines and the second primary terminals are commonly electrically connected to one of the plurality of signal lines, the plurality of signal lines include a first signal line and a second signal line, and the plurality of pixel groups include a first pixel group and a second pixel group arranged adjacent to the first pixel group in a column direction, a signal is read out from the first pixel group via the first signal line, and a signal is read out from the second pixel group via the second signal line.

Further features of the present invention will become apparent from the following description of exemplary embodiments with reference to the attached drawings.

DESCRIPTION OF THE EMBODIMENTS

The present invention will be described below through its exemplary embodiments with reference to the accompanying drawings.

Figure 1:
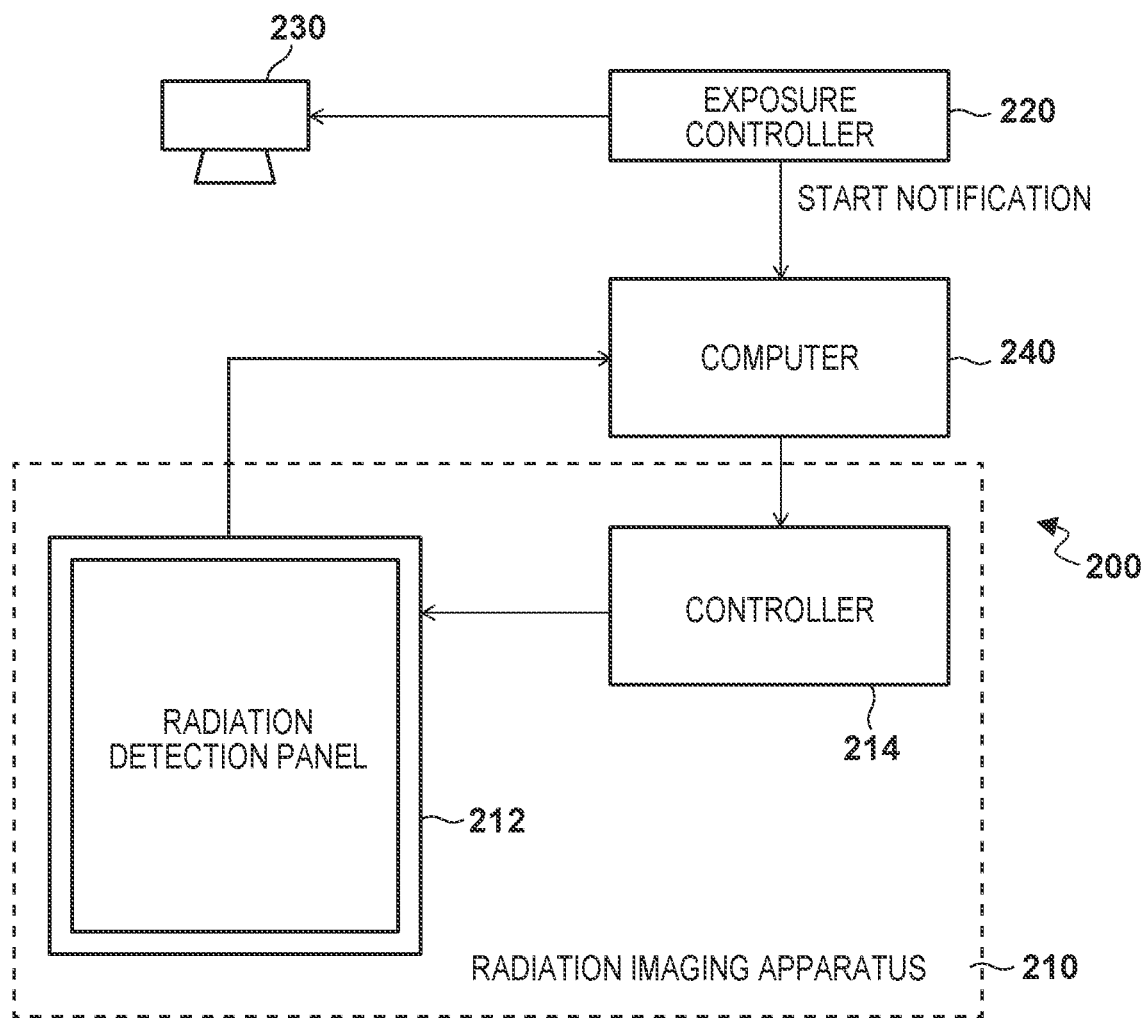
FIG. 1 is a block diagram showing the configuration of a radiation imaging system according to the first embodiment.

FIG. 1 shows the configuration of a radiation imaging system 200 according to the first embodiment of the present invention. The radiation imaging system 200 is configured to electrically capture an optical image formed by radiation and obtain an electrical radiation image (that is, radiation image data). Radiation can typically include X-rays and may be α-rays, β-rays, γ-rays, or the like. The radiation imaging system 200 can include, for example, a radiation imaging apparatus 210, a radiation source 230, an exposure controller 220, and a computer 240.

The radiation source 230 starts emitting radiation in accordance with an exposure command (emission command) from the exposure controller 220. The radiation emitted from the radiation source 230 irradiates the radiation imaging apparatus 210 through an object (not shown). The radiation source 230 stops emitting radiation in accordance with a stop command from the exposure controller 220. The radiation imaging apparatus 210 includes a radiation detection panel 212 and a controller 214 that controls the radiation detection panel 212.

The controller 214 can generate a stop signal for stopping the emission of radiation from the radiation source 230 based on a signal obtained from the radiation detection panel 212. The stop signal is supplied to the exposure controller 220. In response to the stop signal, the exposure controller 220 can send a stop command to the radiation source 230. The controller 214 can be formed by, for example, a PLD (Programmable Logic Device) such as an FPGA (Field Programmable Gate Array), an ASIC (Application Specific Integrated Circuit), a general-purpose computer incorporating programs, or a combination of all or part of them.

The computer 240 controls the radiation imaging apparatus 210 and the exposure controller 220, and receives and processes radiation image data from the radiation imaging apparatus 210. For example, the exposure controller 220 includes an exposure switch, so that when the user turns on the exposure switch, the exposure controller 220 sends an exposure command to the radiation source 230 and also sends a start notification indicating the start of the emission of radiation to the computer 240. Upon receiving the start notification, the computer 240 responds to the start notification to notify the controller 214 of the radiation imaging apparatus 210 of the start of the emission of radiation.

Figure 2:
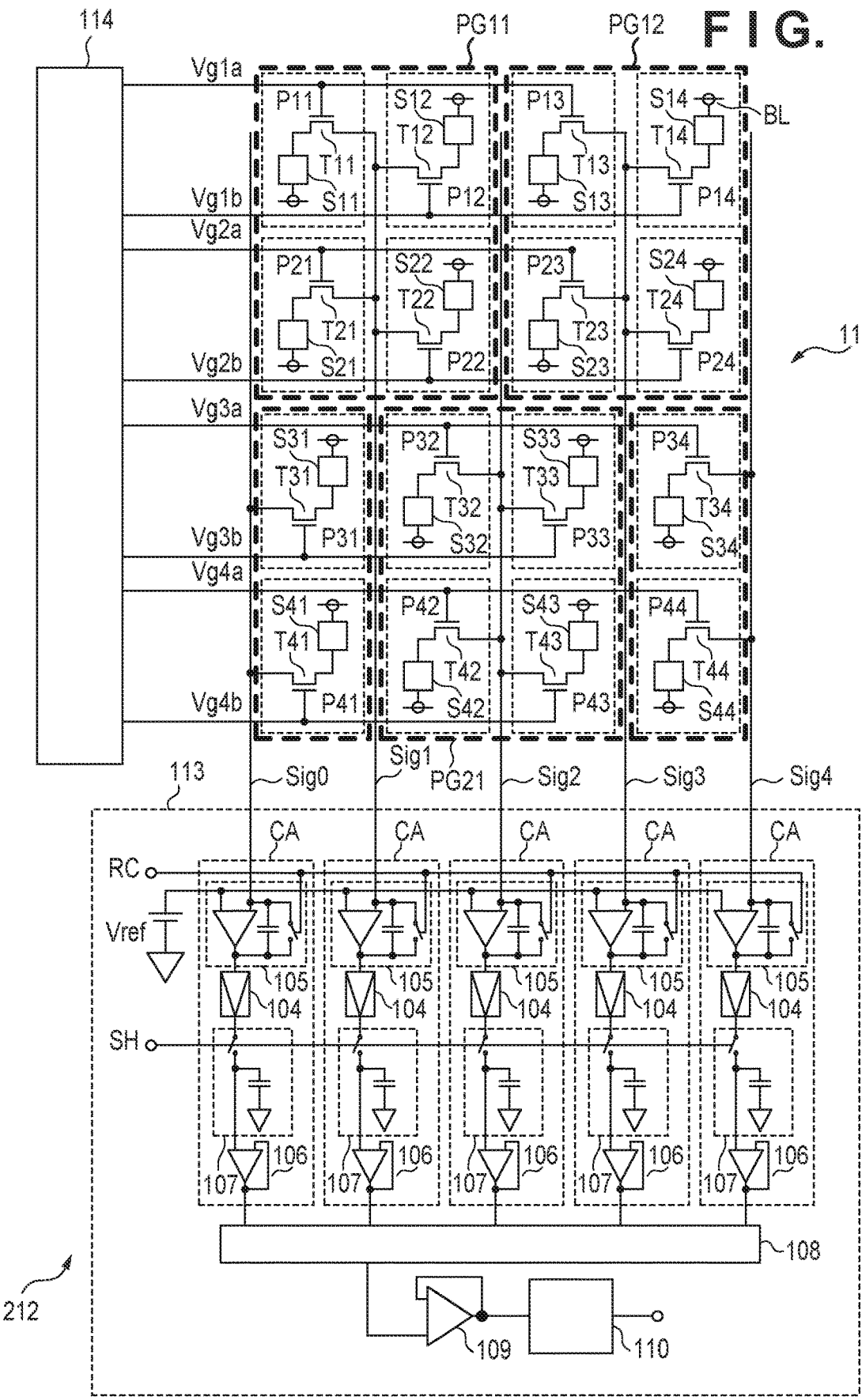
FIG. 2 is a circuit diagram showing an example of the configuration of the radiation detection panel of the radiation imaging system according to the first embodiment.

FIG. 2 shows an example of the configuration of the radiation detection panel 212. The radiation detection panel 212 includes a pixel array 112. A plurality of pixels P, that is, pixels P11 to P44, are arranged in the pixel array 112 so as to form a plurality of rows and a plurality of columns. Each pixel P is configured to detect radiation. The radiation detection panel 212 includes a plurality of signal lines Sig, that is, signal lines Sig0 to Sig4. The radiation detection panel 212 also includes a driving circuit (row selection circuit) 114 that drives the pixel array 112 and a readout circuit 113 that reads out signals from the pixel array 112 via the plurality of signal lines Sig. For the sake of illustrative convenience, FIG. 2 shows the pixel array 112 formed by 4 row×4 column pixels P. In practice, more pixels P can be arrayed. For example, the radiation detection panel 212 has a size of 17 inches, and can include about 3000 row×3000 column pixels P.

The pixels P respectively include conversion elements S, that is, conversion elements S11 to S44, that convert radiation into signals and switches T, that is, switches T11 to T44, that connect the conversion elements S to the signal lines Sig. Note that in this specification, the term "signal" means an electrical signal, and the term "connection" means electrical connection. Connection (electrical connection) between two constituent elements can include, for example, the form of directly connecting the two constituent elements, the form of connecting the constituent elements via a conductor, and the form of connecting the constituent elements via another constituent element such as a switch that can be rendered conductive by being controlled. Each conversion element S outputs a signal corresponding to the amount of incident radiation to the corresponding signal line Sig. The conversion element S can include, for example, a MIS photodiode formed from amorphous silicon as a main material, which is arranged on an insulating substrate such as a glass substrate. Alternatively, the conversion element S can include a PIN photodiode. The conversion element S can be formed as an indirect type element that converts radiation into light via a scintillator layer and then converts the light into a signal. When such indirect type elements are used, the scintillator layer can be shared by a plurality of pixels PIX. Alternatively, the conversion element S may be formed as a direct type element that directly converts radiation into a signal.

Each switch T can be formed from a transistor such as a TFT (thin-film transistor) having a control terminal (gate) and first and second primary terminals (source and drain). The conversion element S includes two electrodes. One electrode of the conversion element S is connected to the first primary terminal of the switch T. The other electrode of the conversion element S is connected to a bias power supply via a common bias line BL. The bias power supply generates a bias voltage. The control terminal of the switch T is connected to a corresponding one of a plurality of driving lines Vg, that is, driving lines Vg1$a$, Vg1$b$, . . . , Vg4$a$, and Vg4$b$. The second primary terminal of the switch T is connected to a corresponding one of the plurality of signal lines Sig.

The pixel array 112 includes a plurality of pixel groups PG, that is, pixel groups PG11, PG12, and PG21. Each pixel group PG is formed from the pixels P arrayed to form at least a 2 row×2 column pattern. In other words, each pixel group PG is formed from an aggregation of n×m pixels P. In this case, n represents the number of pixels in the column direction in the pixel group PG, which is a natural number of 2 or more, and m represents the number of pixels in the row direction in the pixel group PG, which is a natural number of 2 or more. In the case shown in FIG. 2, each pixel group PG includes the pixels P arrayed to form a 2 row×2 column pattern. The plurality of pixel groups PG are arranged in a matrix or two-dimensional pattern.

In the case shown in FIG. 2, the pixels P11, P12, P21, and P22 form one pixel group PG11, and the pixels P13, P14, P23, and P24 form one pixel group PG12. In addition, the pixels P32, P33, P42, and P43 form one pixel group PG21. Note that the group constituted by the pixels P31 and P41 does not satisfy the condition that pixels should form at least a 2 row×2 column pattern, and hence is handled as an incomplete pixel group. Likewise, the group constituted by the pixels P34 and P44 does not satisfy the condition that pixels should form at least a 2 row×2 column pattern, and hence is handled as an incomplete pixel group. Although this embodiment has been described by exemplifying the pixel group PG including the pixels P arrayed to form a 2 row×2 column pattern, the present invention is not limited to this. For example, each pixel group PG may include the plurality of pixels P arrayed to form a 3 row×3 column pattern or to form at least a 2 row×2 column pattern in a more comprehensive manner.

The switches T of the pixels P of each pixel group PG are respectively connected to the plurality of driving lines Vg connected to different control terminals, and the second primary terminals are commonly connected to one signal line Sig, of the plurality of signal lines Sig, which is used for the corresponding pixel group PG. For example, the switches T11, T12, T21, and T22 of the pixel group PG11 formed from the pixels P11, P12, P21, and P22 are respectively connected to the driving lines Vg1$a$, Vg1$b$, Vg2$a$, and Vg2$b$ connected to different control terminals. In addition, the second primary terminals of the switches T11, T12, T21, and T22 of the pixel group PG11 are commonly connected to one signal line Sig1 for the corresponding pixel group PG. The plurality of pixel groups PG include the first pixel group PG11 and the second pixel group PG21 arranged adjacent to the first pixel group PG11 in the column direction. A signal is read out from the first pixel group PG11 via the first signal line Sig1, and a signal is read out from the second pixel group PG21 via the second signal line Sig2. In this case, the first pixel group PG11 and the second pixel group PG21 are arranged adjacent to each other in the column direction such that the pixel P22 of the first pixel group PG11 is adjacent to the pixel P32 of the second pixel group PG21.

In the first embodiment, the plurality of driving lines Vg are arranged such that at least two driving lines Vg are assigned to each row (formed from the pixels P) in the pixel array 112. In the case shown in FIG. 2, the plurality of driving lines Vg are arranged such that the two driving lines Vg are assigned to each row (formed from the pixels P) in the pixel array 112.

Such arrangements will be described below from another point of view. That is, in the first embodiment, one pixel group is formed from pixels whose control terminals of the switches are connected to different driving lines, with all the second primary terminals of the switches being connected to the same signal line. One pixel group is formed from at least 2 row×2 column pixels, and at least 2 row×2 column pixels forming one pixel group include no pixels forming another pixel group. In addition, in the first embodiment, one pixel group is formed so as to allow one virtual rectangle to enclose the group. Furthermore, in the first embodiment, adjacent pixels that are connected to different signal lines or the same driving line do not belong to the same pixel group. The above point applies to other embodiments in this specification unless otherwise specified.

Consider a case in which the pixel array 112 is formed from a larger number of pixel groups. The plurality of pixel groups PG can include a plurality of first pixel groups PG11, PG31, . . . connected to the first signal line Sig1 and a plurality of second pixel groups PG21, PG41, . . . connected to the second signal line Sig2. Each of the plurality of second pixel groups PG21, PG41, . . . is adjacent to at least one of the plurality of first pixel groups PG11, PG31, . . . in the column direction. More specifically, each of the plurality of second pixel groups PG21, PG41, . . . is adjacent to one or two of the plurality of first pixel groups PG11, PG31, . . . in the column direction. In this case, the pixel group PG31 can be formed from pixels P51, P52, P61, and P62. The pixel group PG41 can be formed from pixels P72, P73, P82, and P83. Note that a pixel Pxy indicates the pixel arranged in the xth row and the yth column. The first pixel groups PG11, PG31, . . . and the second pixel groups PG21, PG41, . . . can be alternately arranged. Alternatively, the first pixel groups PG11, PG31, . . . and the second pixel groups PG21, PG41, . . . can be arranged in a staggered pattern along the column direction.

In the first mode, the driving circuit 114 supplies driving signals having different active periods to the switches T of the plurality of pixels P forming the pixel group PG via the plurality of corresponding driving lines Vg. This enables the readout circuit 113 to individually read out signals from the plurality of pixels P forming the pixel group PG via one signal line Sig.

In contrast, in the second mode, the driving circuit 114 supplies driving signals whose active periods overlap each other to the switches T of the plurality of pixels P forming the pixel group PG via the plurality of corresponding driving lines Vg. This enables the readout circuit 113 to read out a synthesized signal (average signal) obtained by synthesizing signals from the plurality of pixels P forming the pixel group PG via one signal line Sig.

Accordingly, in this embodiment, in the second mode, it is possible to read out signals from the pixel array 112 at a readout speed four times that in the first mode. On the other hand, in the embodiment, in the first mode, it is possible to form an image with a resolution about four times (about two times×two times) that in the second mode. Therefore, the first mode can be suitably used as a still-image mode, a high-resolution mode, or the like and the second mode can be suitably used as a moving-image mode, a low-resolution mode, a preview mode, or the like.

The readout circuit 113 includes a plurality of column amplifiers CA such that one column amplifier CA corresponds to one signal line Sig. Each column amplifier CA includes, for example, an integration amplifier 105, a variable amplifier 104, a sample/hold circuit 107, and a buffer circuit 106. The integration amplifier 105 amplifies a signal appearing on the corresponding signal line Sig. The integration amplifier 105 can include, for example, an operational amplifier, and an integration capacitor and a reset switch that are connected in parallel between the inverting input terminal and the output terminal of the operational amplifier. A reference potential Vref is supplied to the noninverting input terminal of the operational amplifier. Turning on the reset switch will reset the integration capacitor and reset the potential of the signal to the reference potential Vref. The reset switch can be controlled by a reset pulse RC supplied from the controller 214.

The variable amplifier 104 performs amplification at the amplification factor set by the integration amplifier 105. The sample/hold circuit 107 samples/holds a signal from the variable amplifier 104. The sample/hold circuit 107 can be formed from, for example, a sampling switch and a sampling capacitor. The buffer circuit 106 outputs a signal from the sample/hold circuit 107 upon buffering (impedance conversion). The sampling switch can be controlled by a sampling pulse supplied from the controller 214.

The readout circuit 113 includes a multiplexer 108 that selects and outputs signals from the plurality of column amplifiers CA provided in correspondence with the plurality of signal lines Sig in a predetermined order. The multiplexer 108 includes, for example, a shift register. The shift register performs a shift operation in accordance with a clock signal supplied from the controller 214 and selects one signal from the plurality of column amplifiers CA. The readout circuit 113 can also include a buffer 109 that performs buffering (impedance conversion) of a signal output from the multiplexer 108 and an AD converter 110 that converts a signal output as an analog signal from the buffer 109 into a digital signal. An output from the AD converter 110, that is, radiation image data, is supplied to the computer 240.

Figure 3:
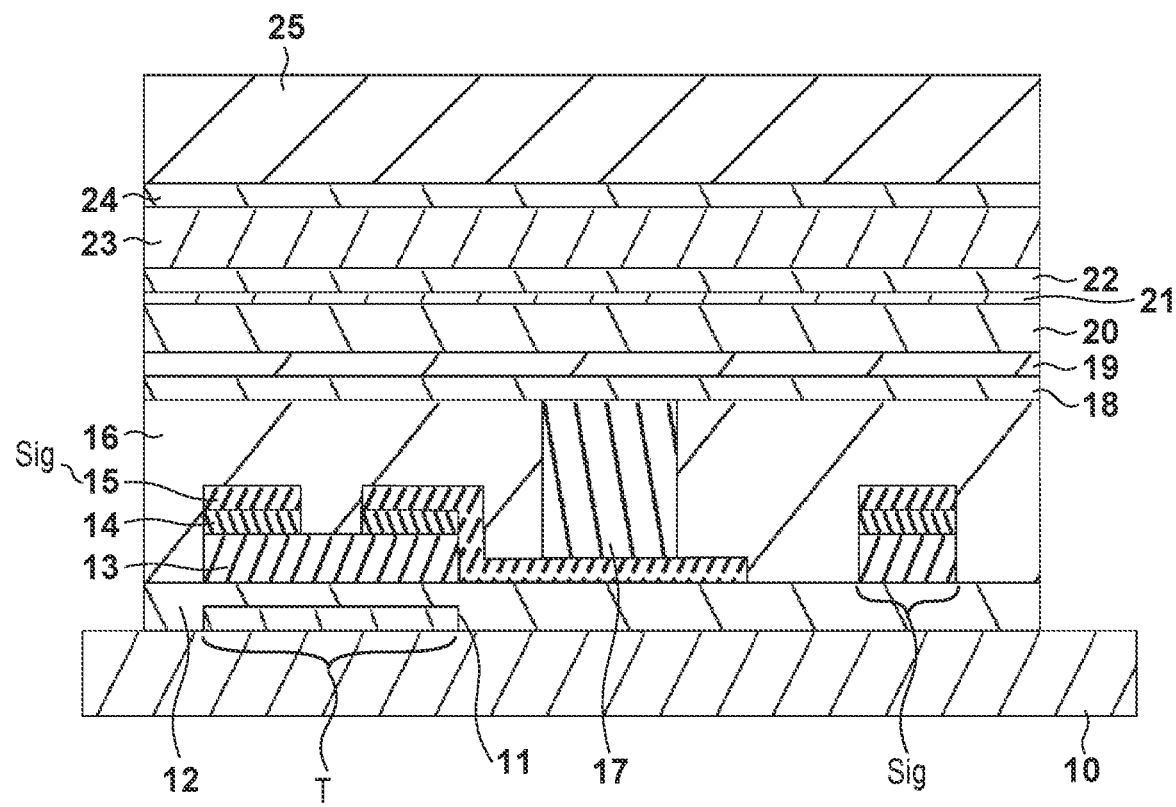
FIG. 3 is a view schematically showing an example of the sectional structure of a pixel.

An example of the configuration of the pixel P will be described with reference to FIG. 3. FIG. 3 schematically shows an example of the sectional structure of one pixel P. The pixel P can be formed on an insulating substrate 10 such as a glass substrate. The pixel P can include a first conductive layer 11, a first insulating layer 12, a first semiconductor layer 13, a first impurity semiconductor layer 14, and a second conductive layer 15 on the insulating substrate 10. The first conductive layer 11 can form the gate of a transistor (for example, a TFT) forming the switch T. The first insulating layer 12 can be arranged to cover the first conductive layer 11. The first semiconductor layer 13 can be arranged on the first insulating layer 12 on a portion of the first conductive layer 11 which forms the gate. The first impurity semiconductor layer 14 can be on the first semiconductor layer 13 so as to form the two primary terminals (source and drain) of the transistor forming the switch T. The second conductive layer 15 can form wiring patterns respectively connected to the two primary terminals (source and drain) of the transistor forming the switch T. One part of the second conductive layer 15 forms the signal line Sig, and the other part of the second conductive layer 15 can form a wiring pattern for connecting the conversion element S to the switch T.

The pixel P can also include a dielectric interlayer 16 covering the first insulating layer 12 and the second conductive layer 15. The dielectric interlayer 16 can be provided with a contact plug 17 for connection to the second conductive layer 15 of the switch T. The pixel P further includes the conversion element S arranged on the dielectric interlayer 16. In the case shown in FIG. 3, the conversion element S is formed as an indirect type conversion element including a scintillator layer 25 that converts radiation into light. The conversion element S can include a third conductive layer 18, a second insulating layer 19, a second semiconductor layer 20, a second impurity semiconductor layer 21, a fourth conductive layer 22, a protective layer 23, an adhesive layer 24, and the scintillator layer 25, which are stacked on the dielectric interlayer 16. The third conductive layer 18, the second insulating layer 19, the second semiconductor layer 20, the second impurity semiconductor layer 21, the fourth conductive layer 22, the protective layer 23, the adhesive layer 24, and the scintillator layer 25 can form the conversion element S.

The third conductive layer 18 and the fourth conductive layer 22 respectively form the lower electrode and the upper electrode of a photoelectric conversion element forming the conversion element S. The fourth conductive layer 22 is formed from, for example, a transparent material. The third conductive layer 18, the second insulating layer 19, the second semiconductor layer 20, the second impurity semiconductor layer 21, and the fourth conductive layer 22 form a MIS sensor as the photoelectric conversion element. The second impurity semiconductor layer 21 is formed from, for example, an n-type impurity semiconductor layer. The scintillator layer 25 is formed from, for example, a gadolinium-based material or CsI (cesium iodide) material.

The conversion element S may be formed as a direct type conversion element that directly converts incident radiation into an electrical signal (charge). As each direct type conversion element S, for example, there is available a conversion element containing amorphous selenium, gallium arsenide, gallium phosphide, lead iodide, mercury iodide, CdTe, or CdZnTe as a main material. The conversion element S is not limited to a MIS type and may be, for example, a pn-type or PIN-type photodiode.

Figure 4:
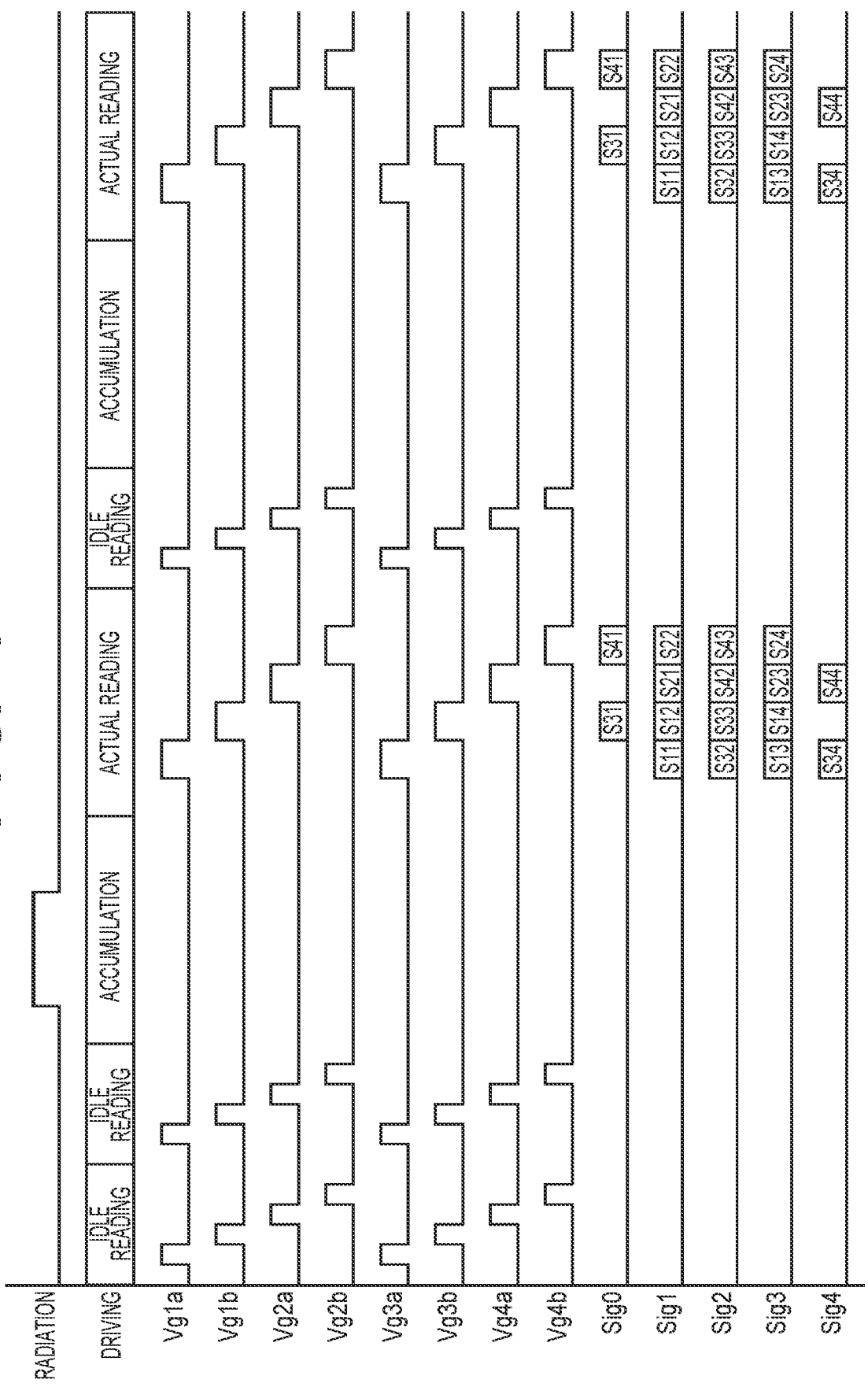
FIG. 4 is a timing chart showing the operation of the radiation imaging system according to the first embodiment.

An example of the operations of the radiation imaging apparatus 210 and the radiation imaging system 200 in the first mode (the still-image mode in this case) will be described below with reference to FIG. 4. In this example, the computer 240 controls the operation of the radiation imaging system 200. The controller 214 controls the operation of the radiation imaging apparatus 210 under the control of the computer 240.

In this example, first of all, the controller 214 causes the driving circuit 114 and the readout circuit 113 to execute idle reading until the start of emission of radiation from the radiation source 230 (in other words, irradiation of the radiation imaging apparatus 210 with radiation). In idle reading, the driving circuit 114 sequentially drives the driving signals supplied to the driving lines Vg1a, Vg1b, Vg2a, Vg2b, Vg3a, Vg3b, Vg4a, and Vg4b in a plurality of rows of the pixel array 112 to the active level. This resets the dark charge accumulated in each conversion element S. In this case, at the time of idle reading, an active-level reset pulse is supplied to the reset switch of the integration amplifier 105 to reset the signal line Sig to the reference potential Vref. Dark charge is charge generated in spite of no radiation incident on the conversion element S.

In the first mode (for example, the still-image mode) in this example, one pixel P is reset via one signal line Sig. The driving circuit 114 sets the driving line Vg1a to the active level to render the switch T11 conductive and connect the conversion element S11 to the signal line Sig1, thereby resetting the conversion element S11 to the reference potential Vref. In addition, in this example, the switch T13 is rendered conductive simultaneously with the switch T11 to connect the conversion element S13 to the signal line Sig3, thereby resetting the conversion element S13 to the reference potential Vref. Furthermore, in the example, the driving circuit 114 sets the driving line Vg3a to the active level simultaneously with the driving line Vg1a to render the switch T32 conductive to connect the conversion element S32 to the signal line Sig2, thereby resetting the conversion element S32 to the reference potential Vref. In addition, the switch T34 is rendered conductive simultaneously with the switch T32 to connect the conversion element S34 to the signal line Sig4, thereby resetting the conversion element S34 to the reference potential Vref. In this manner, an idle reading operation is performed while the two driving lines Vg of the plurality of driving lines Vg are simultaneously driven to the active level to reset the dark charge accumulated in each conversion element S.

The controller 214 can recognize the start of emission of radiation from the radiation source 230 based on, for example, a start notification supplied from the exposure controller 220 via the computer 240. Alternatively, the controller 214 may be provided with a detection circuit that detects a current flowing in the bias line BL, the signal line Sig, or the like of the pixel array 112. The controller 214 can recognize the start of emission of radiation from the radiation source 230 based on an output from the detection circuit.

In this example, in accordance with the start of emission of radiation, the controller 214 controls the driving circuit 114 so as to render the switches T of all the pixels P non-conductive. This sets all the pixels of the pixel array 112 in an accumulated state. In addition, in accordance with the end of emission of radiation, the controller 214 finishes the accumulated state, and shifts the state to an actual reading state. The controller 214 can recognize the end of emission of radiation based on an end notification supplied via the computer 240. Alternatively, the controller 214 determines the end of emission of radiation when a predetermined time has elapsed since the start of emission of radiation. Alternatively, the controller 214 can determine the end of emission of radiation based on an output from the detection circuit that detects a current flowing in the bias line BL, the signal line Sig, or the like.

In actual reading in this example, the controller 214 controls the driving circuit 114 and the readout circuit 113 to execute a readout operation (actual reading) of signals from the pixel array 112. In actual reading, the driving circuit 114 drives the driving lines Vg1a, Vg1b, Vg2a, Vg2b, Vg3a, Vg3b, Vg4a, and Vg4b in a plurality of rows of the pixel array 112 to the active level. In this case, the driving circuit 114 controls the plurality of driving lines Vg so as to cause one pixel P to drive one signal line Sig. In other words, the driving circuit 114 operates to supply driving signals having different active periods to the switches T of the plurality of pixels P forming the pixel group PG via the plurality of corresponding driving lines Vg.

In this case, the driving circuit 114 simultaneously drives the two driving lines Vg1a and Vg3a to the active level. This operation causes signals from the pixels P11 and P13 (the conversion elements S11 and S13) to be respectively output to the signal lines Sig1 and Sig3 and also causes signals from the pixels P32 and P34 (conversion elements S32 and S34) to be respectively output to the signal lines Sig2 and Sig4. The driving circuit 114 then simultaneously drives the two driving lines Vg1b and Vg3b to the active level. This operation causes signals from the pixels P12 and P14 (the conversion elements S12 and S14) to be respectively output to the signal lines Sig1 and Sig3 and also causes signals from the pixels P31 and P33 (conversion elements S31 and S33) to be respectively output to the signal lines Sig0 and Sig2. As described above, in this case, signals from pixel groups adjacent to each other in the column direction (for example, the pixel groups PG11 and P21) are simultaneously output to the different signal lines Sig, and the readout circuit 113 reads out the signals. In the above manner, the readout circuit 113 reads out signals from all the pixels P of the pixel array 112. The signals read out by the readout circuit 113 are output as radiation image data to the computer 240 via the multiplexer 108, the buffer 109, and the AD converter 110.

In the first mode according to the first embodiment, only some pixels P of all the pixels P in one row are connected to one driving line Vg, and the pixels P from which signals are simultaneously read out are distributed to two rows. This makes it difficult to visually recognize noise if any. In contrast, in a configuration in which all the pixels P in one row are connected to one driving line Vg, when noise occurs, the noise tends to appear as noise continuous in the row direction in an image.

A driving method according to the first mode has an aspect of simultaneously reading out signals from a plurality of pixels in different rows via different signal lines in the radiation imaging apparatus in which only some pixels P of all the pixels P in one row are connected to one driving line Vg. Alternatively, the driving method according to the first mode has an aspect of simultaneously reading out signals from only part of the pixels forming one row and only part of the pixels forming another row via different signal lines. In this case, adjacent pixels within a specific row are preferably connected to different driving lines. In addition, pixels from which signals are simultaneously read out in the first mode are preferably not adjacent to each other. In other words, pixels from which signals are simultaneously read out are preferably arranged such that another pixel from which no signal is read out simultaneously is interposed between them.

The acquisition of an offset image will be described next. Dark charge remains in each conversion element S even in a state without irradiation with radiation. This makes it possible to acquire an image by accumulation and actual reading in a state without irradiation with radiation and to use the acquired image as an offset image. More specifically, it is possible to obtain a radiation image from which an offset component is removed by subtracting an offset image from a radiation image obtained by reading out signals accumulated in the pixel array 112 in a state with irradiation with radiation by actual reading. "Accumulation" and following "actual reading" without irradiation with radiation shown near the right end portion in FIG. 4 correspond to an example of the acquisition of an offset image in this case.

Figure 5:
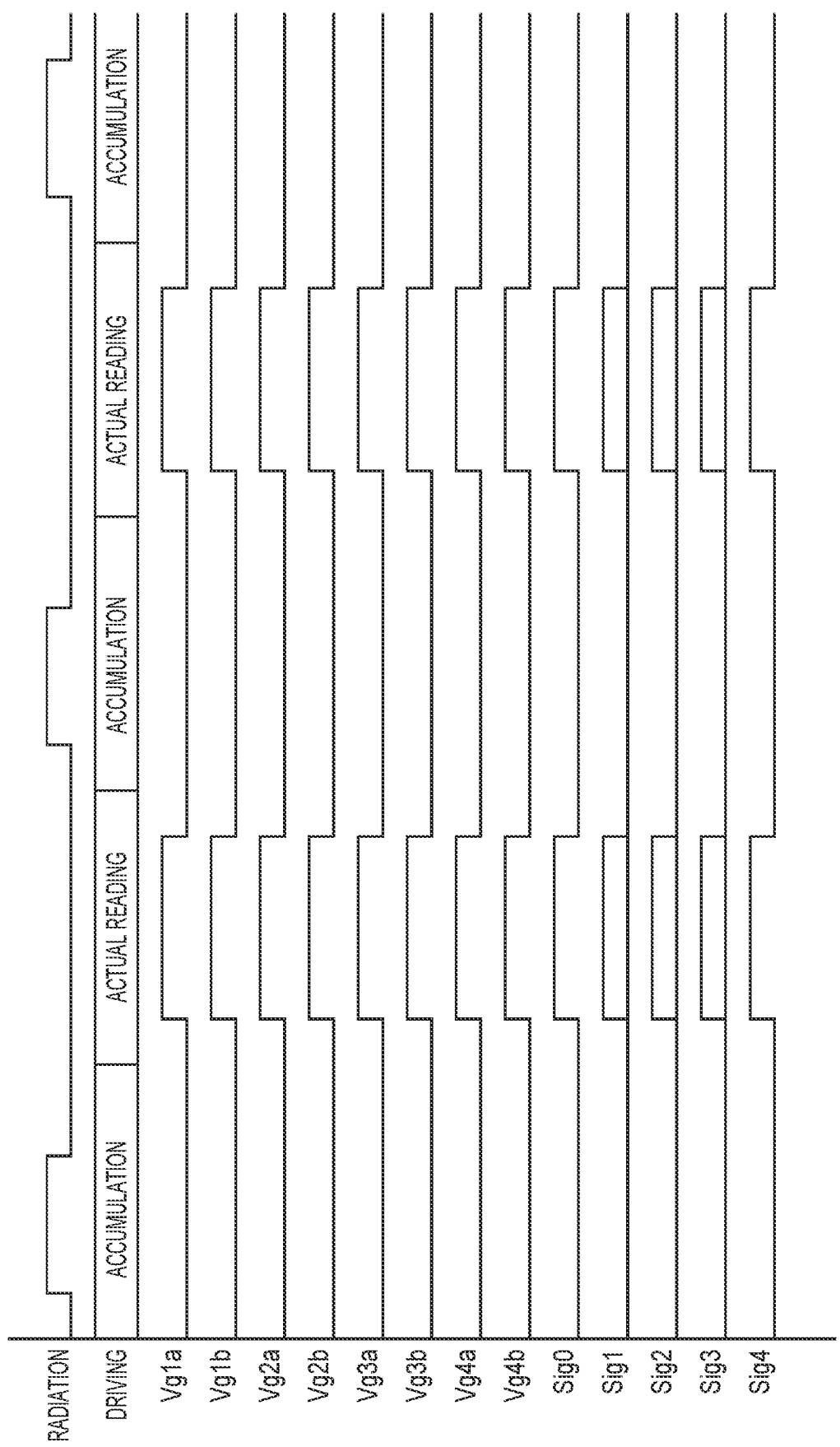
FIG. 5 is a timing chart showing the operation of the radiation imaging system according to the first embodiment.

The operations of the radiation imaging apparatus 210 and the radiation imaging system 200 in the second mode (the moving-image mode in this case) will be described below with reference to FIG. 5. In the second mode, a plurality of cycles are executed, with one cycle including accumulation at the time of irradiation with radiation and following actual reading. In the second mode (moving-image mode), the driving circuit 114 supplies driving signals whose active periods overlap each other to the control terminals of the switches T of the respective pixels P of each pixel group PG via the plurality of driving lines Vg.

More specifically, the driving circuit 114 supplies driving signals whose active periods overlap each other to the control terminals of the switches T of the pixels P11, P12, P21, and P22 of the pixel group PG11 via the plurality of driving lines Vg1*a*, Vg1*b*, Vg2*a*, and Vg2*b*. At this time, the driving circuit 114 also supplies driving signals whose active periods overlap each other to the control terminals of the switches T of the pixels P13, P14, P23, and P24 of the pixel group PG12 via the plurality of driving lines Vg1*a*, Vg1*b*, Vg2*a*, and Vg2*b*. With this operation, a synthesized signal (average signal) obtained by synthesizing signals from the conversion elements S11, S12, S21, and S22 of the pixels P11, P12, P21, and P22 forming the pixel group PG11 appears in the signal line Sig1. The readout circuit 113 reads out the synthesized signal. In addition, a synthesized signal obtained by synthesizing signals from the conversion elements S13, S14, S23, and S24 of the pixels P13, P14, P23, and P24 forming the pixel group PG12 appears in the signal line Sig3. The readout circuit 113 reads out the synthesized signal.

The driving circuit 114 supplies driving signals whose active periods overlap each other to the control terminals of the switches T of the pixels P32, P33, P42, and P43 forming the pixel group PG21 via the plurality of driving lines Vg3*a*, Vg3*b*, Vg4*a*, and Vg4*b*. At this time, the driving circuit 114 also supplies driving signals whose active periods overlap each other to the control terminals of the switches T of the pixels P31 and P41 via the plurality of driving lines Vg3*b* and Vg4*b*. In addition, the driving circuit 114 also supplies driving signals whose active periods overlap each other to the control terminals of the switches T of the pixels P34 and P44 via the plurality of driving lines Vg3*a* and Vg4*a*. With this operation, a synthesized signal obtained by synthesizing signals from the conversion elements S32, S33, S42, and S43 of the pixels P32, P33, P42, and P43 forming the pixel group PG21 appears in the signal line Sig2. The readout circuit 113 reads out the synthesized signal. In addition, with this operation, a synthesized signal obtained by synthesizing signals from the conversion elements S31 and S41 of the pixels P31 and P41 forming an incomplete pixel group appears in the signal line Sig0. The readout circuit 113 reads out the synthesized signal. Furthermore, a synthesized signal obtained by synthesizing signals from the conversion elements S34 and S44 of the pixels P34 and P44 forming an incomplete pixel group appears in the signal line Sig4. The readout circuit 113 reads out the synthesized signal.

As described above, according to the first embodiment, in the second mode, signals can be read out from the pixel array 112 at a speed 4 times higher than in the first mode (¼ the time required). In the first embodiment, as described above, the first pixel groups PG11, PG31, . . . and the second pixel groups PG21, PG41, . . . can be arrayed in a staggered pattern along the column direction. That is, the first pixel groups and the second pixel groups are arrayed so as to be shifted from each other by one pixel in the row direction.

Figure 6:
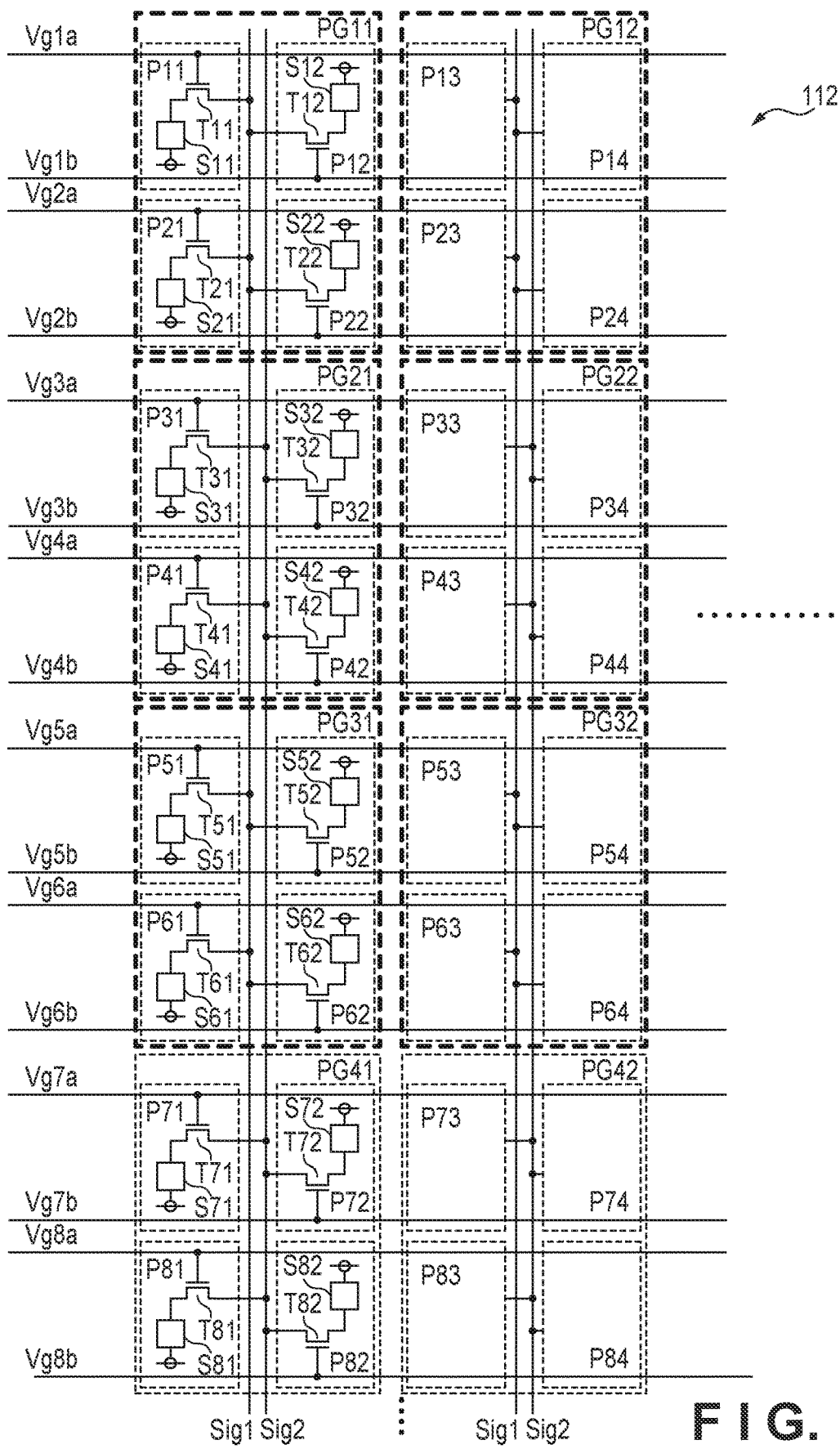
FIG. 6 is a circuit diagram showing an example of the configuration of the radiation detection panel of a radiation imaging system according to the second embodiment.

FIG. 6 shows an example of the configuration of a pixel array 112 in a radiation imaging system 200, a radiation imaging apparatus 210, and a radiation detection panel 212 according to the second embodiment of the present invention. Particulars that are not referred to in the second embodiment can comply with the first embodiment. In the second embodiment, first pixel groups PG11, PG31, PG51, . . . and second pixel groups PG21, PG41, PG61, . . . are linearly arrayed along the column direction. In addition, in the second embodiment, a plurality of signal lines Sig, that is, signal lines Sig1, Sig2, Sig3, . . . , are arranged such that one signal line Sig is assigned to each column (each column of pixels P).

Figure 7:
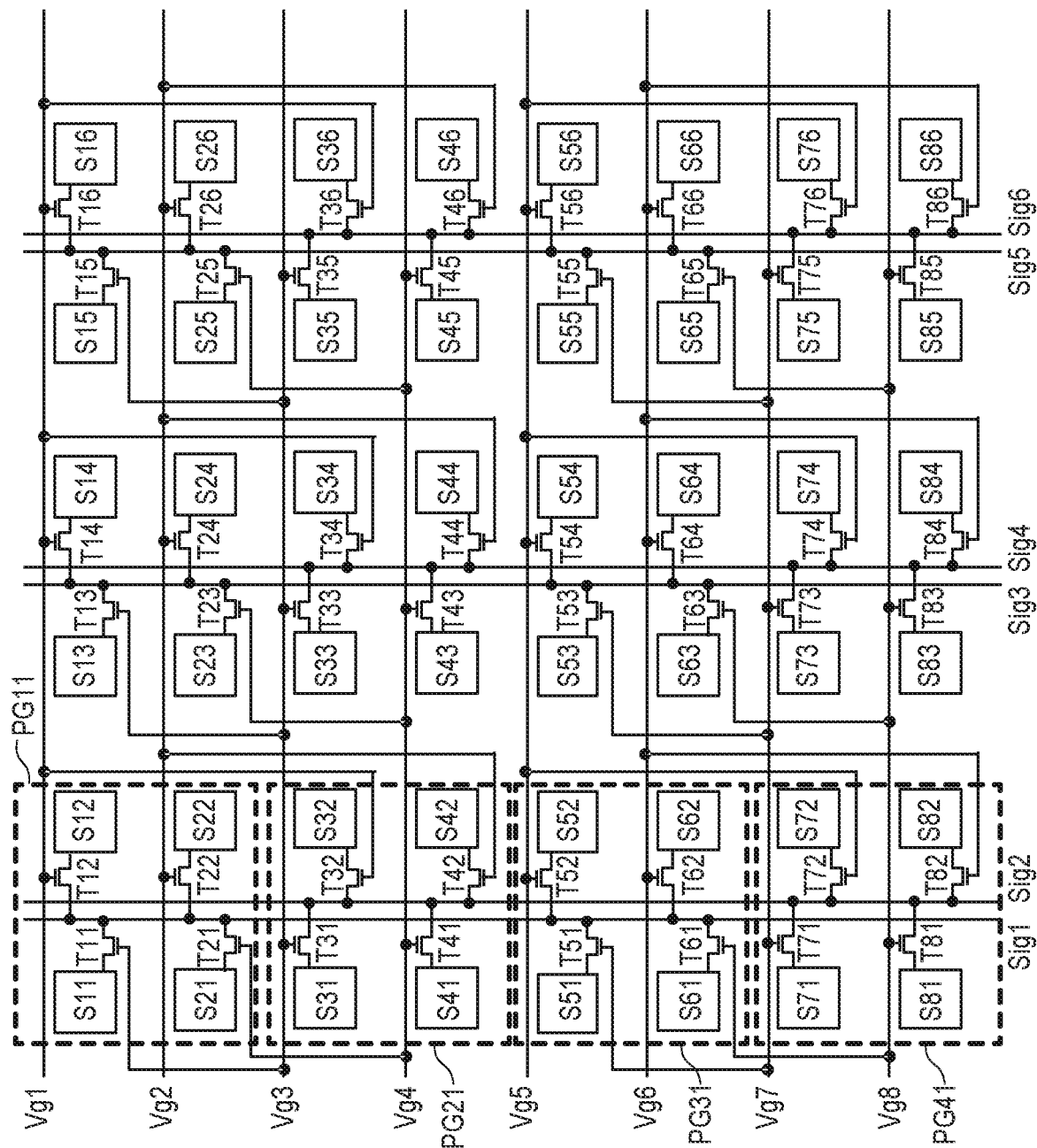
FIG. 7 is a circuit diagram showing an example of the configuration of the radiation detection panel of a radiation imaging system according to the third embodiment.

FIG. 7 shows an example of the configuration of a pixel array 112 in a radiation imaging system 200, a radiation imaging apparatus 210, and a radiation detection panel 212 according to the third embodiment of the present invention. Particulars that are not referred to in the third embodiment can comply with the first embodiment. In the first and second embodiments, the plurality of driving lines Vg are arranged such that at least two driving lines Vg are assigned to each row (each row of pixels P). In the third embodiment, a plurality of driving lines Vg are arranged such that one driving line Vg is assigned to each row (each row of pixels P).

In the example shown in FIG. 7, driving lines Vg3, Vg1, Vg4, and Vg2 are respectively connected to the control terminals of switches T11, T12, T21, and T22 of pixels P11, P12, P21, and P22 forming a pixel group PG11.

Figure 8:
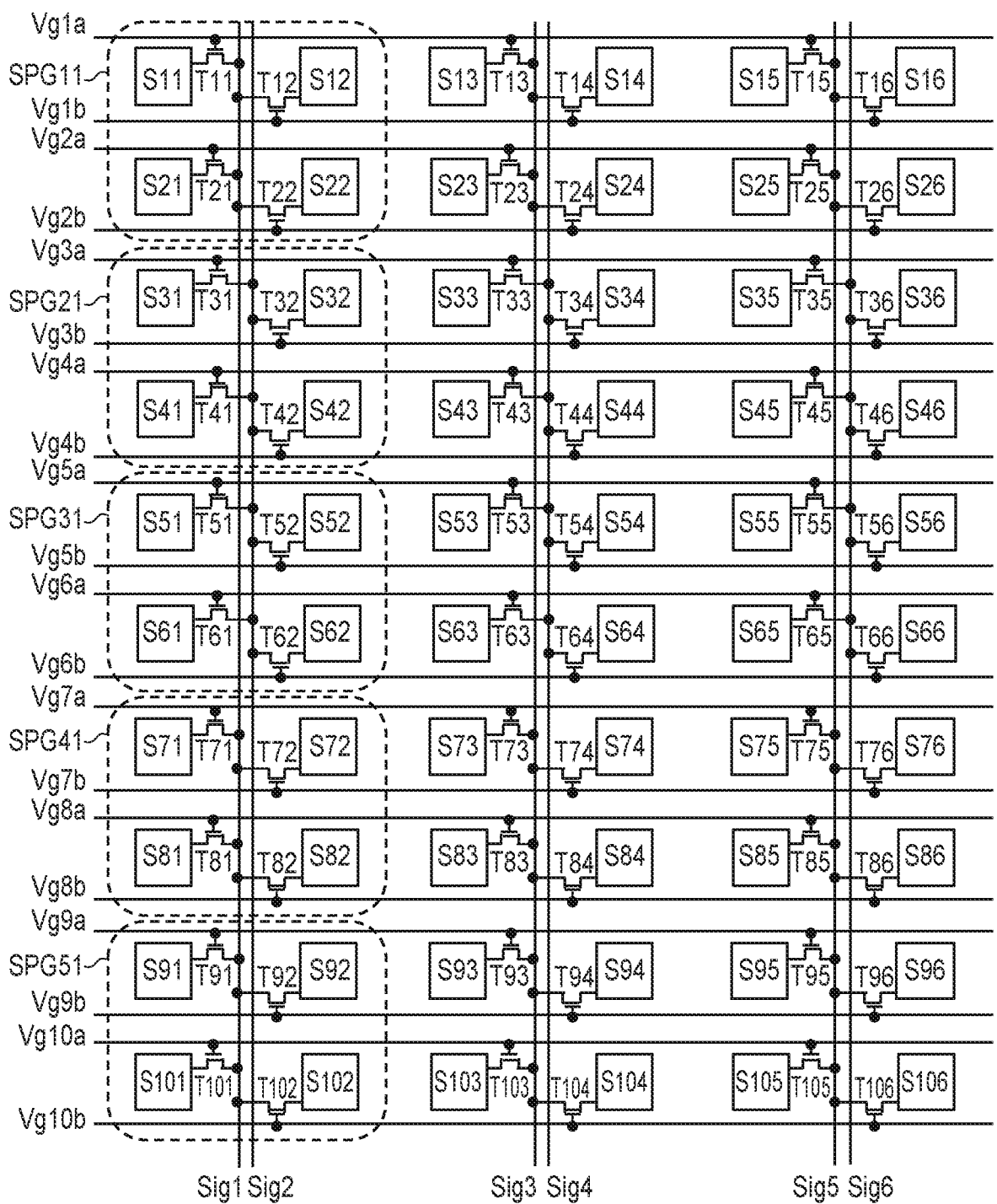
FIG. 8 is a circuit diagram showing an example of the configuration of the radiation detection panel of a radiation imaging system according to the fourth embodiment.

FIG. 8 shows an example of the configuration of a pixel array 112 in a radiation imaging system 200, a radiation imaging apparatus 210, and a radiation detection panel 212 according to the fourth embodiment of the present invention. Particulars that are not referred to in the fourth embodiment can comply with the first embodiment. In the fourth embodiment, first sub-pixel groups SPG11, SPG41, and SPG51 are connected to a first signal line Sig1, and second sub-pixel groups SPG21 and SPG31 are connected to a second signal line Sig2. A plurality of sub-pixel groups SPG of the pixel array 112 can include a plurality of first sub-pixel groups SPG11, SPG41, and SPG51 connected to the first signal line Sig1 and a plurality of second sub-pixel groups SPG21 and SPG31 connected to the second signal line Sig2.

A plurality of first sub-pixel groups can form a plurality of first pixel groups each formed from at least two first sub-pixel groups. For example, the first sub-pixel groups SPG41 and SPG51 form one first pixel group, and first sub-pixel groups SPG81 and SPG91 (not shown) can form another first pixel group. A plurality of second sub-pixel groups can form a plurality of second pixel groups each formed from at least two second sub-pixel groups. For example, the second sub-pixel groups SPG21 and SPG31 form one second pixel group, and second sub-pixel groups SPG61 and SPG71 (not shown) can form another second pixel group. The first pixel groups and the second pixel groups can be arranged alternately in the column direction.

The pixel array 112 in the radiation imaging system 200, the radiation imaging apparatus 210, and the radiation detection panel 212 according to the fourth embodiment can have a first sub-mode and a second sub-mode as sub-modes of the second mode.

Figure 9:
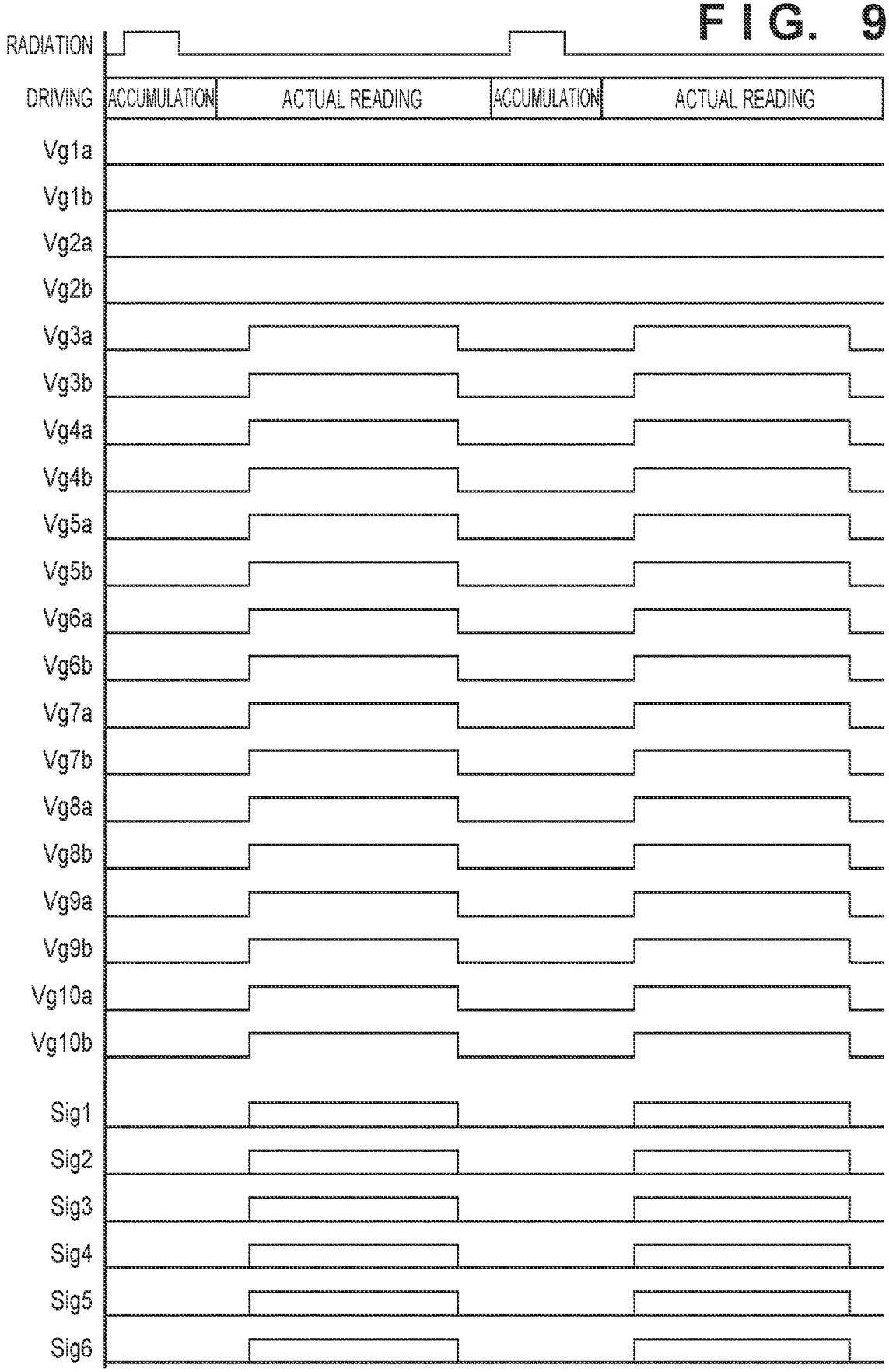
FIG. 9 is a timing chart showing the operation of the radiation imaging system according to the fourth embodiment.

In the first sub-mode of the second mode, a synthesized signal (addition signal or average signal) can be generated from 4 row×2 column pixels (eight pixels). As shown in FIG. 9, a driving circuit 114 can supply active-level driving signals to driving lines Vg3a to Vg10b. In this case, a synthesized signal from the first pixel group formed from the first sub-pixel groups SPG41 and SPG51 is output to the first signal line Sig1. In addition, a synthesized signal from the second pixel group formed from the second sub-pixel groups SPG21 and SPG31 is output to the second signal line Sig2. A readout circuit 113 reads out these synthesized signals.

In this example, eight adjacent pixels (for example, S33, S34, S43, S44, S53, S54, S63, and S64) of a first pixel group form a third pixel group. A synthesized signal formed from signals from the eight pixels forming the third pixel group can be read out simultaneously with a synthesized signal from the first pixel group. Digitally adding this synthesized signal and the synthesized signal read out from the first pixel group can also generate a low-resolution image corresponding to 4 row×4 column pixels.

In the second sub-mode of the second mode, a synthesized signal (addition signal or average signal) can be generated from 2 row×2 column pixels (four pixels). In this case, in the first period, the driving circuit 114 supplies active-level driving signals to driving lines Vg1a to Vg4b. With this operation, a synthesized signal formed from signals from pixels forming the sub-pixel group SPG11 is output to the first signal line Sig1. In addition, a synthesized signal formed from signals from pixels forming the sub-pixel group SPG21 is output to the second signal line Sig2. The readout circuit 113 reads out these synthesized signals. In the second period, the driving circuit 114 supplies active-level driving signals to driving lines Vg5a to Vg8b. With this operation, a synthesized signal formed from signals from pixels forming the sub-pixel group SPG41 is output to the first signal line Sig1. In addition, a synthesized signal formed from signals from pixels forming the sub-pixel group SPG31 is output to the second signal line Sig2. The readout circuit 113 reads out these synthesized signals.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-238919, filed Dec. 13, 2017, which is hereby incorporated by reference herein in its entirety.

What is claimed is:

1. A radiation imaging apparatus, comprising:
   a pixel array in which a plurality of pixels are arranged to form a plurality of rows and a plurality of columns, a readout circuit configured to read out signals from the pixel array via a plurality of signal lines, and a driving circuit configured to drive the pixel array;
   each pixel including a conversion element configured to convert radiation into a signal and a switch, the switch including a control terminal, a first primary terminal electrically connected to the conversion element, and a second primary terminal electrically connected to one of the plurality of signal lines;
   the pixel array including a plurality of pixel groups each including at least a first pixel, a second pixel arranged adjacent to the first pixel in a row direction, a third pixel arranged adjacent to the first pixel group in a column direction, and a fourth pixel arranged adjacent to the second pixel group in the column direction;

the control terminals of the switches of the first, second, third and fourth pixels of one pixel group being electrically connected to a plurality of different driving lines driven by the driving circuit, and the second primary terminals of the switches of the first, second, third and fourth pixels of the one pixel group being commonly electrically connected to one of the plurality of signal lines;

the plurality of signal lines including a first signal line and a second signal line arranged adjacent to the first signal line in the row direction; and the plurality of pixel groups including a first pixel group and a second pixel group arranged adjacent to the first pixel group in the column direction, wherein the second primary terminals of the switches of the first, second, third and fourth pixels of the first pixel group are commonly electrically connected to the first signal line, and signals of the first pixel group are read out via the first signal line, the second primary terminals of the switches of the first, second, third and fourth pixels of the second pixel group are commonly electrically connected to the second signal line, and signals of the second pixel group are read out via the second signal line, the driving circuit supplies driving signals whose active periods overlap each other to the control terminals of the switches of pixels of each pixel group via the plurality of different driving lines, and the readout circuit is configured to read out a synthesized signal obtained by synthesizing signals from the plurality of pixels forming one pixel group out of the plurality of pixel groups by supplying driving signals whose active periods overlap each other through one signal line of the plurality signal lines.

2. The apparatus according to claim 1, wherein in a first mode the driving circuit supplies driving signals having different active periods to the control terminals of the switches of pixels of each pixel group via the plurality of different driving lines, and in a second mode the driving circuit supplies driving signals whose active periods overlap each other to the control terminals of the switches of pixels of each pixel group via the plurality of different driving lines.

3. The apparatus according to claim 1, wherein the plurality of pixel groups are arranged in a matrix pattern.

4. The apparatus according to claim 1, wherein the plurality of different driving lines are arranged such that at least two driving lines are assigned to each row.

5. The apparatus according to claim 1, wherein the plurality of different driving lines are arranged such that one driving line is assigned to each row.

6. The apparatus according to claim 1, wherein the plurality of different driving lines are arranged such that one driving line is assigned to each column.

7. The apparatus according to claim 1, wherein the plurality of pixel groups include a plurality of first and second pixel groups, the first pixel groups being connected to the first signal line, and the plurality of second pixel groups each being arranged adjacent to at least one of the plurality of first pixel groups in the column direction and connected to the second signal line, and the plurality of first pixel groups and the plurality of second pixel groups being alternately arranged in the column direction.

8. The apparatus according to claim 1, wherein the plurality of pixel groups include a plurality of first and second pixel groups, the first pixel groups being connected to the first signal line, and the plurality of second pixel groups being arranged adjacent to the first pixel groups in the column direction and connected to the second signal line, each first pixel group being formed from a plurality of first sub-pixel groups each including pixels arrayed to form at least a 2 row×2 column pattern, and each second pixel group being formed from a plurality of second sub-pixel groups each including pixels arrayed to form at least a 2 row×2 column pattern.

9. The apparatus according to claim 8, wherein the plurality of first sub-pixel groups forming the first pixel group are arranged linearly along the column direction, and the plurality of second sub-pixel groups forming the second pixel group are arranged linearly along the column direction.

10. The apparatus according to claim 1, wherein the switch comprises a thin-film transistor.

11. The apparatus according to claim 1, wherein signals are simultaneously read out from the first pixel group and the second pixel group.

12. The apparatus according to claim 8, further comprising a third pixel group adjacent to the first pixel group in the row direction, the third pixel group being formed from a plurality of third sub-pixel groups, each third sub-pixel group including pixels arrayed to form at least a 2 row×2 column pattern, wherein signals are simultaneously read out from the first pixel group and the third pixel group.

13. The apparatus according to claim 2, wherein the pixel array includes a plurality of pixel groups each including pixels arrayed to form at least a 2 row×2 column pattern, the driving circuit supplies driving signals to the switches of the respective pixels of each pixel group via a plurality of different driving lines, with a signal being read out by one of the plurality of signal lines, the plurality of signal lines includes a first signal line and a second signal line, and the plurality of pixel groups includes a first pixel group and a second pixel group, in the first mode the driving circuit supplies the driving signals having different active periods to the respective switches of the respective pixels of each pixel group via the plurality of different driving lines, thereby reading out signals from the first pixel group via the first signal line and reading out signals from the second pixel group via the second signal line, and in the second mode the driving circuit supplies the driving signals whose active periods overlap each other to the switches of the respective pixels of each pixel group via the plurality of different driving lines, thereby reading out signals from the first pixel group via the first signal line and reading out signals from the second pixel group via the second signal line.

14. The apparatus according to claim 13, wherein the plurality of pixel groups include a plurality of first and second pixel groups, the first pixel groups being connected to the first signal line, and the plurality of second pixel groups being arranged adjacent to the first pixel group in a column direction and connected to the second signal line, and the plurality of first pixel groups and the plurality of second pixel groups being alternately arranged in the column direction.

15. The apparatus according to claim 14, wherein the plurality of first pixel groups and the plurality of second pixel groups are linearly arranged in the column direction.

16. The apparatus according to claim 14, wherein the plurality of first pixel groups and the plurality of second pixel groups are arranged in a staggered pattern in the column direction.

17. The apparatus according to claim 13, wherein signals are simultaneously read out from the first pixel groups and the second pixel group.

18. A radiation imaging system comprising:
   a radiation imaging apparatus defined in claim 1;
   a radiation source; and
   a computer configured to control the radiation imaging apparatus.

19. A method of driving a radiation imaging apparatus including a pixel array in which a plurality of pixels are arranged to form a plurality of rows and a plurality of columns, a plurality of signal lines, a readout circuit configured to read out signals from the pixel array via the plurality of signal lines, and a driving circuit configured to drive the pixel array,
   each pixel including a conversion element configured to convert radiation into a signal and a switch, the switch including a control terminal, a first primary terminal electrically connected to the conversion element, and a second primary terminal electrically connected to one of the plurality of signal lines,
   the pixel array including a plurality of pixel groups each including at least a first pixel, a second pixel arranged adjacent to the first pixel in a row direction, a third pixel arranged adjacent to the first pixel group in a column direction, and a fourth pixel arranged adjacent to the second pixel group in the column direction,
   the control terminals of the switches of the first, second, third and fourth pixels of one pixel group being electrically connected to a plurality of different driving lines driven by the driving circuit, and the second primary terminals of the switches of the first, second, third and fourth pixels of the one pixel group being commonly electrically connected to one of the plurality of signal lines,
   the plurality of signal lines including a first signal line and a second signal line arranged adjacent to the first signal line in the row direction,
   the plurality of pixel groups including a first pixel group and a second pixel group arranged adjacent to the first pixel group in the column direction, wherein
   the second primary terminals of the switches of the first, second, third and fourth pixels of the first pixel group are commonly electrically connected to the first signal line, and signals of the first pixel group are read out via the first signal line, and
   the second primary terminals of the switches of the first, second, third and fourth pixels of the second pixel group are commonly electrically connected to the second signal line, and signals of the second pixel group are read out via the second signal line,
the method comprising:
a first mode of separately reading out signals from the respective pixels of the first pixel group via the first signal line by supplying driving signals having different active periods to the respective switches of the respective pixels of the first pixel group via the plurality of driving lines for the first pixel group, and separately reading out signals from the respective pixels of the second pixel group via the second signal line by supplying driving signals having different active periods to the respective switches of the respective pixels of the second pixel group via the plurality of driving lines for the second pixel group, and
a second mode of reading out a synthesized signal from the first pixel group via the first signal line by supplying driving signals whose active periods overlap each other to the switches of the respective pixels of the first pixel group via the plurality of driving lines for the first pixel group, and reading out a synthesized signal from the second pixel group via the second signal line by supplying driving signals whose active periods overlap each other to the switches of the respective pixels of the second pixel group via the plurality of driving lines for the second pixel group.

* * * * *